(12) United States Patent
Wetzig et al.

(10) Patent No.: US 8,191,850 B2
(45) Date of Patent: Jun. 5, 2012

(54) LONGITUDINAL ADJUSTER WITH AT LEAST ONE END STOP

(75) Inventors: Stefan Wetzig, Ennepetal (DE); Hans Dropmann, Köln (DE); Philipp Giesecke, Remscheid (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 198 days.

(21) Appl. No.: 12/674,072

(22) PCT Filed: Feb. 25, 2009

(86) PCT No.: PCT/EP2009/001312
§ 371 (c)(1),
(2), (4) Date: Feb. 18, 2010

(87) PCT Pub. No.: WO2009/109316
PCT Pub. Date: Sep. 11, 2009

(65) Prior Publication Data
US 2011/0101194 A1 May 5, 2011

(30) Foreign Application Priority Data
Mar. 6, 2008 (DE) .......................... 10 2008 012 888

(51) Int. Cl.
*F16M 13/00* (2006.01)
(52) U.S. Cl. .................. 248/429; 296/65.01; 297/344.11
(58) Field of Classification Search .................. 248/424, 248/429, 430; 297/344.11; 296/65.01
See application file for complete search history.

(56) References Cited

U.S. PATENT DOCUMENTS

| 2010/0181460 A1* | 7/2010 | Park et al. ..................... 248/429 |
| 2010/0320353 A1* | 12/2010 | Kojima et al. ................ 248/430 |

FOREIGN PATENT DOCUMENTS

| DE | 4304456 | 8/1993 |
| DE | 19804506 | 8/1999 |
| DE | 10236067 | 2/2004 |
| DE | 102005012018 | 9/2006 |
| FR | 2847530 | 5/2004 |

* cited by examiner

*Primary Examiner* — Ramon Ramirez
(74) *Attorney, Agent, or Firm* — McGlew and Tuttle, P.C.

(57) ABSTRACT

A longitudinal adjuster, in particular for a vehicle seat, has at least one first seat rail (2) and, at least one second seat rail (3) which is arranged in a manner such that it can be displaced in a sliding manner relative to the first seat rail (2), and at least one end stop (11, 21, 31, 41, 51) which is attached to the first seat rail (2) and limits the relative displaceability of the two seat rails (2, 3) to each other by means of interaction with a second end stop (3a) which is formed by the second seat rail (3) or is attached to same. The first seat rail (2) is provided with at least two apertures (2e) through each of which protrudes a region of the end stop (11, 21, 31, 41, 51) serving to limit the seat rail movement in the longitudinal direction of the seat rails (2, 3), and the region is formed by a respective tab (11a, 21a, 31a, 41a, 51a); formed integrally with the end stop (11, 21, 31, 41, 51). The associated aperture (2e) is formed in each case by a slot (2e) in the first seat rail (2), and the two tabs (11a, 21a, 31a, 41a, 51a) are arranged at the same height in the longitudinal direction of the seat rail (2).

20 Claims, 5 Drawing Sheets

LONGITUDINAL ADJUSTER WITH AT LEAST ONE END STOP

CROSS REFERENCE TO RELATED APPLICATIONS

This application is a United States National Phase application of International Application PCT/EP2009/001312 and claims the benefit of priority under 35 U.S.C. §119 of German Patent Application DE 10 2008 012 888.0 filed, Mar. 6, 2008 the entire contents of which are incorporated herein by reference.

FIELD OF THE INVENTION

The invention relates to a longitudinal adjuster with at least one end stop, in particular for a vehicle seat with at least one first seat rail and at least one second seat rail which is arranged in a manner such that it may be displaced in a sliding manner relative to the first seat rail.

BACKGROUND OF THE INVENTION

A longitudinal adjuster for a vehicle seat is known from DE 102 36 067 B4, with a first seat rail, to which first stop surfaces are associated, and a second seat rail displaceable in a sliding manner relative to the first seat rail, to which second stop surfaces are associated, the first stop surfaces and the second stop surfaces cooperating for limiting the relative motion of the second seat rail to the first seat rail. The first seat rail is connected at fastening points to the vehicle structure. For reinforcement at these fastening points and as an end stop during the displacement of the second seat rail, two stop plates of elongate configuration are provided. These stop plates respectively have four screw holes with internal threads arranged in series in the longitudinal direction of the rails, of which two are configured as through-holes, which face into the interior of the profile formed by the two seat rails. Along the two longitudinal edges, tabs are formed on the stop plates, which have first stop surfaces on the front face aligned in the longitudinal direction of the rails. On the second seat rail, an engagement part is arranged, the second stop surfaces being arranged on the engagement part. The engagement part reinforces the mutual interlocking of the two seat rails. In the longitudinal adjuster, the first stop surfaces are arranged on a stop plate connected to the first seat rail at fastening points, the stop plate being able to be selected from a set of different stop plates, and being able to be attached at different orientations relative to the longitudinal direction of the rails.

DE 198 04 506 C2 discloses an end stop for limiting the regulating distance of a longitudinal adjustment device for seats. The seat part of the seat is in this connection fastened to slide rails, each slide rail being longitudinally displaceable in a guide rail secured to the vehicle floor and at least one slide rail being able to be secured by means of a locking device in selectable longitudinal positions on the guide rail. In this connection, an end stop is provided between the slide rail and the guide rail. To provide a resilient energy-absorbing end stop, and to avoid production processes for the mounting of the end stop, said end stop is formed by an impact element with a snap-in head, penetrating an aperture of the guide rail, and a locking hook penetrating said impact element and latching onto the guide rail.

A longitudinal adjuster for a vehicle seat is further known from DE 10 2005 012 018 A1, with at least one first seat rail, at least one second seat rail, which is arranged in a manner such that it may be displaced in a sliding manner relative to the first seat rail, and at least one end stop, which is attached to the first seat rail, and limits the relative displaceability of the two seat rails to one another by means of interaction with a second end stop, which is formed by the second seat rail or attached thereto, the end stops being arranged in the interior of an assembled hollow profile formed by the seat rails. In this connection, a plurality of apertures are provided in the seat rail, into which protruding regions of the end stop engage, at least one of the protruding regions which engage in an aperture, protruding through the aperture, and by means of the protruding region, by interaction with the second end stop, limiting the seat rail movement in the longitudinal direction of the seat rails.

SUMMARY OF THE INVENTION

The object of the invention is to improve a longitudinal adjuster of the aforementioned type.

The invention relates to a longitudinal adjuster, in particular for a vehicle seat, with at least one first seat rail, at least one second seat rail which is arranged in a manner such that it may be displaced in a sliding manner relative to the first seat rail, and with at least one end stop which is attached to the first seat rail and limits the relative displaceability of the two seat rails to each other by means of interaction with a second end stop which is formed by the second seat rail or is attached thereto. In this connection, a plurality of apertures is provided in the seat rail, into which protruding regions of the end stop engage, at least two apertures being provided, through each of which protrudes a protruding region of the end stop, serving to limit the seat rail movement in the longitudinal direction of the seat rails. The protruding regions of the end stop, which protrude through the apertures and limit the rail movement in the longitudinal direction of the seat rails, are thus arranged at the same height in the longitudinal direction of the seat rail.

The protruding region is preferably formed by one respective tab formed integrally with the end stop, the associated aperture is formed in each case by a slot in the first seat rail, and the two tabs are arranged at the same height in the longitudinal direction of the seat rail. As the end stop is attached from the outside to one of the seat rails, in particular the lower rail, if required a retrospective assembly is also possible, in particular a repair may be carried out from outside relatively easily. In particular, in the case of damping elements which may be arranged on the end stop, and which wear over time, a replacement of the corresponding end stops is thus possible. Moreover, as a plurality of apertures is provided in the seat rail, not all of which are used, an adjustability of the end stop during assembly or possible retrospective attachment may be provided. In particular, the stops may be assembled at a later time than is otherwise usual, for example in a just-in-time plant or directly at the automobile manufacturer. The seat rails together with the end stops may be used for different vehicles, with different requirements, in particular different adjustment lengths of the seat.

The provision of two protruding regions, in particular tabs, which may come to bear against two corresponding regions of the second end stop, distributes the forces which occur in the event of a movement of the seat rails into the end position, onto two partial regions. These partial regions are particularly preferably arranged mirror symmetrically to the central longitudinal line of the rails. In particular, in the region of the central longitudinal line further means for force transmission, such as fastening means (for example rivets, screws, or the like) or projections, which protrude in corresponding openings of the other component are preferred.

The end stop is preferably of T-shaped configuration, the ends of the crossbar being bent in one direction by an angle of 45° to a maximum of 135°, in particular preferably 60° to 90°, relative to the longitudinal member of substantially planar configuration, and form tabs which protrude through apertures in the first seat rail and one respective lateral region of the tabs protruding through the apertures interacts with the second end stop.

Quite particularly preferably, the ends of the crossbar are bent in one direction by 75° or 90° relative to the longitudinal member of substantially planar configuration, tolerances of up to +/−10° being able to occur as a result of production. By means of an embodiment with tabs bent upwards by 75°, the end stop has an improved strength, by means of an embodiment with tabs bent upwards by 90°, the slots in the corresponding rail may be kept narrower and the assembly is somewhat simplified.

In particular, a projection and an opening are preferably configured along the central longitudinal line of the longitudinal member. The projection is preferably used in this connection for pre-positioning. The opening serves for subsequent fixing of the end stop to the rail by means, for example, of a blind rivet in addition to fixing the correct alignment of the end stop-longitudinal member parallel to the rail longitudinal axis.

Preferably the opening is arranged centrally between the tabs. In particular, the opening is preferably arranged along the central longitudinal line of the seat rail.

The end stop has preferably at least one projection which is positioned in an aperture configured in the first seat rail, in particular an oblong hole or an opening, and with one region bears against the edge region of the aperture.

Preferably, the end stop has at least one notch, which interacts with an edge region of an aperture in the first seat rail, in particular keeps the end stop in abutment against the seat rail, in the end position and/or during a pivoting movement in the course of assembly.

In particular, the end stop preferably has insertion aids. The insertion aids are particularly preferably formed by regions of the tabs which are of curved configuration, protruding in the insertion direction. These regions of the tabs of curved configuration may simply be inserted in slots configured in the first seat rail, the alignment of the end stop being oblique relative to the seat rail. After complete insertion, a pivoting motion takes place by which the seat rail and end stop are brought to lie flat against one another. In this connection, a projection which engages in an opening of the seat rail preferably ensures the correct position of the end stop relative to the seat rail.

Alternatively, after inserting the insertion aids and a pivoting motion in which an edge region of the rail is positioned in the notch, after reaching a position which is still slightly oblique relative to the first seat rail, a sliding motion may be provided, by which the notch is brought out of engagement with the edge region and the side of the tab opposing the notch is brought to bear against the opposing edge region. As a result of the return movement, the projection and opening are aligned with one another, so that the end stop may be moved into its end position.

After the positioning has taken place, a fastening of the end stop to the seat rail takes place particularly preferably by means of a blind rivet, which may be attached from outside.

For reducing noise, on the end stop at least one resiliently deformable damping element is particularly preferably provided in the region of the surface coming into contact with the second end stop. This damping element damps the impact of the end stops and prevents the striking of metal on metal. The damping element may, for example, be formed by coating the end stop with a resilient material. Also, an attachment of a damping element of block-like or cylindrical configuration is possible on the surfaces which come into contact with the other end stop. The attachment may take place in any manner, for example by means of bonding, clipping, pushing-on or insertion into a correspondingly configured receiver region.

The end stop is particularly preferably formed by a stamped and bent part made of metal, which may be produced easily and cost-effectively. However, other suitable materials are also possible, such as for example a plastics material which is sufficiently hard and has a sufficient load-bearing capacity. In the case of an embodiment as a plastics component, a damping element may be directly injection-molded in a two-component injection-molding method.

Particularly preferably, the maximum regulating distance, which is limited by fixed end stops provided on the seat rails, may be additionally limited by the end stops according to the invention, in particular preferably directly in the factory of the automobile manufacturer, so that an adaptation to different vehicle series is possible on site. Thus the fixed end stops provided on the seat rails provide an additional safety mechanism against a release of the seat rails if, for example, during assembly in the factory of the automobile manufacturer the variable end stop had been inadvertently forgotten.

The invention is described in more detail hereinafter with reference to a plurality of embodiments shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 16:
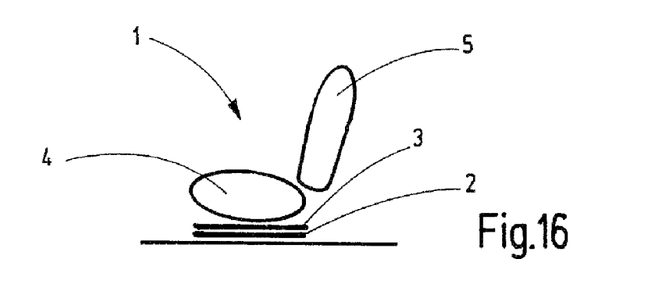
FIG. 16 is a schematic side view of a vehicle seat with the vehicle structure indicated.

Referring to the drawings in particular, a vehicle seat 1 shown schematically in FIG. 16 for a motor vehicle has two first seat rails, also denoted hereinafter as lower rails 2, which are fixedly connected at fastening points to the vehicle structure, two second seat rails, also denoted hereinafter as upper rails 3, which are arranged in a manner such that they may be displaced in a sliding manner relative to the respectively associated first seat rail, and a seat part 4 with a backrest 5 which are arranged on the second seat rails and thus displaceably relative to the first seat rails. Via structures and adjustment devices (not shown) known per se, the seat height, seat inclination and backrest inclination may be adjusted in a manner known per se. Moreover, the seat position may be adjusted in the longitudinal direction of the vehicle by a further adjustment device, by displacing the second seat rails relative to the first seat rails, corresponding latching devices (not shown) being provided for fixing the respectively desired position of the seat rails to one another. For limiting the longitudinal displacement of the seat rails relative to one another stops are respectively provided, about which further details will be provided during the course of the subsequent description of the individual embodiments.

Due to the embodiment of the seat rails of the seat rail pairs which are configured to be substantially mirror symmetrical, as well as the corresponding stops between the first and second seat rails in both directions of the longitudinal displaceability, the invention is described hereinafter in more detail with reference to the description of an end stop, the construction of the vehicle seat 1 apart from the stops and the corresponding adaptations of the seat rails, insofar as they are not explained below in detail, being consistent in all embodiments.

Moreover, in all embodiments described hereinafter, the first seat rail or lower rail 2 is formed by a U-shaped profile, in which the edges are bent back twice inwards. The second seat rail or upper rail 3 is mounted therein, it also being formed by a U-shaped profile, in which however an edge region is bent back outwards, so that the end is positioned in the edge region of the first seat rail, viewed in the longitudinal direction of the second seat rail, a part (not shown) being bent back further so that said part is arranged within the edge which has been bent back twice, and a part forming an end stop 3a of the second seat rail, having a greater height relative to the base of the second seat rail and additionally only being bent outwards by approximately 90° (see FIG. 8).

In the region of the surfaces of the end stops in contact with one another, to reduce noise, although not expressly mentioned below, a damping element may be attached to one or both end stops, in particular made of a resilient plastics material. The attachment may be carried out in any manner, for example by bonding on a buffer or partially coating the base body forming the end stop.

The first seat rail is positioned in a manner known per se by means of a centering pin arranged on the vehicle structure, which is guided through a centering opening 2a, having a circular cross section, of the seat rail and serving as centering aid, and in the present case fixed by means of two screws which are inserted through two fastening openings 2b, having a circular cross section, of the seat rail, and screwed in the vehicle structure. The fastening may, however, also take place in any other suitable manner.

First Embodiment

According to the first embodiment an end stop 11, which is formed by a T-shaped stamped and bent part made of sheet metal, is attached to a lower rail 2. In this connection, as is visible from FIG. 6, the two opposing ends, also denoted as tabs 11a, of the crossbar are bent upwards at an angle of 90°. In the longitudinal member, approximately between the tabs 11a, are formed an opening 11b with a circular cross section and in the other part of the longitudinal member a cam-like projection 11c with a circular cross section, which projects in the same direction as the tabs 11a, the opening 11b and projection 11c being located in the central longitudinal line of the longitudinal member.

For attaching the end stop 11 in a position which meets requirements, in the longitudinal direction of the lower rail 2 a plurality of openings 2c with circular cross sections and oblong holes 2d are provided on said lower rail along the central longitudinal line thereof and slots 2e are provided on both sides of the openings 2c, an opening 2c, an oblong hole 2d and two slots 2e arranged on both sides of the opening 2c respectively securing a possible position of the end stop 11. The internal diameter of the opening 2c corresponds substantially to the internal diameter of the opening 11b of the end stop 11. The width of the oblong holes 2d corresponds substantially to the diameter of the cam-like projection 11c of the end stop 11, the width of the oblong holes 2d being slightly greater than the diameter of the projection 11c. The slot lengths of the slots 2e in the lower rail 2 correspond substantially to the widths of the tabs 11a, the slot lengths of the slots 2e being slightly greater than the widths of the tabs 11a, the widths of the slots 2e however, corresponding substantially to the thickness of the tabs 11a.

The tabs 11a of the end stop 11 are placed in the desired position of the end stop 11 relative to the lower rail 2 through two opposing slots 2e arranged accordingly in the lower rail 2, and the projection 11c of the end stop 11 is positioned in an adjacently arranged oblong hole 2d, a simple assembly being possible by the oversize of the openings relative to the regions arranged therein. By the corresponding design of the arrangements of the openings and oblong holes in the lower rail 2 the correct installation direction of the end stop 11 is ensured. The insertion of a blind rivet 12 in the opening 2c of the lower rail 2, which is aligned with the opening 11b, fixes the final position of the end stop 11 on the lower rail 2, and this position is secured by the riveting of the blind rivet 12.

Second Embodiment

Figures 9, 10:
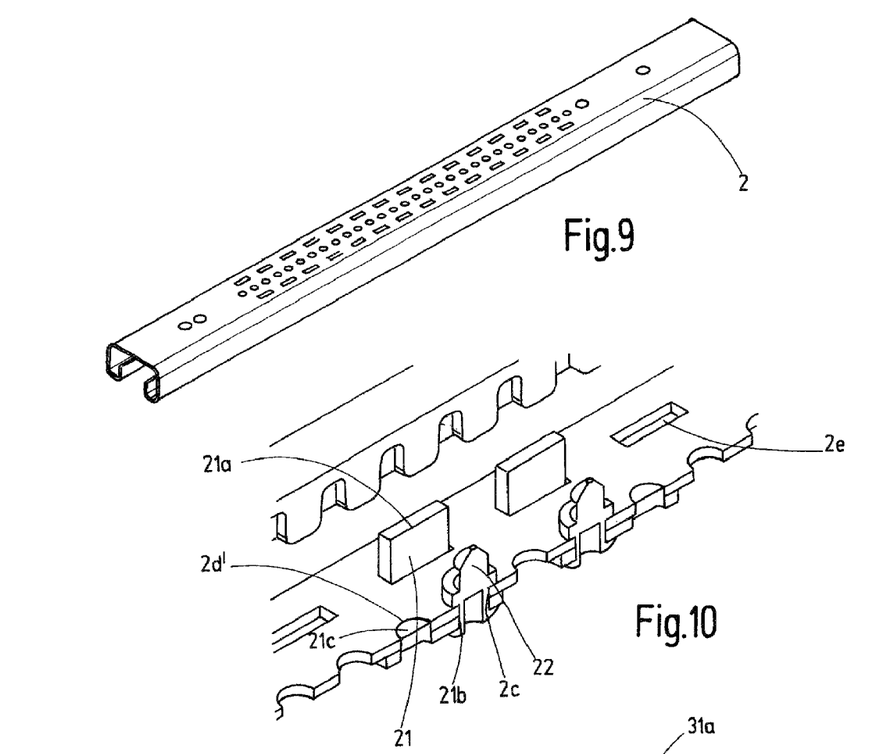
FIG. 9 is a perspective view of a lower rail without stops according to the second embodiment.
FIG. 10 is a perspective detailed view of the lower rail of FIG. 9 with two stops.

According to the second embodiment which, provided it is not described hereinafter, corresponds to the first embodiment, second openings 2d' with circular cross section are provided on the lower rail 2 in place of the oblong holes 2d. In this connection, the openings 2c, hereinafter denoted also as first openings to differentiate from the second openings 2d', are arranged centrally between a pair of slots 2e, and the first and second openings 2c and 2d', which respectively have the same internal diameter, are arranged centrally along the central longitudinal line of the lower rail 2 continuously and at uniform intervals from one another.

Figures 4, 5, 6, 7, 8:
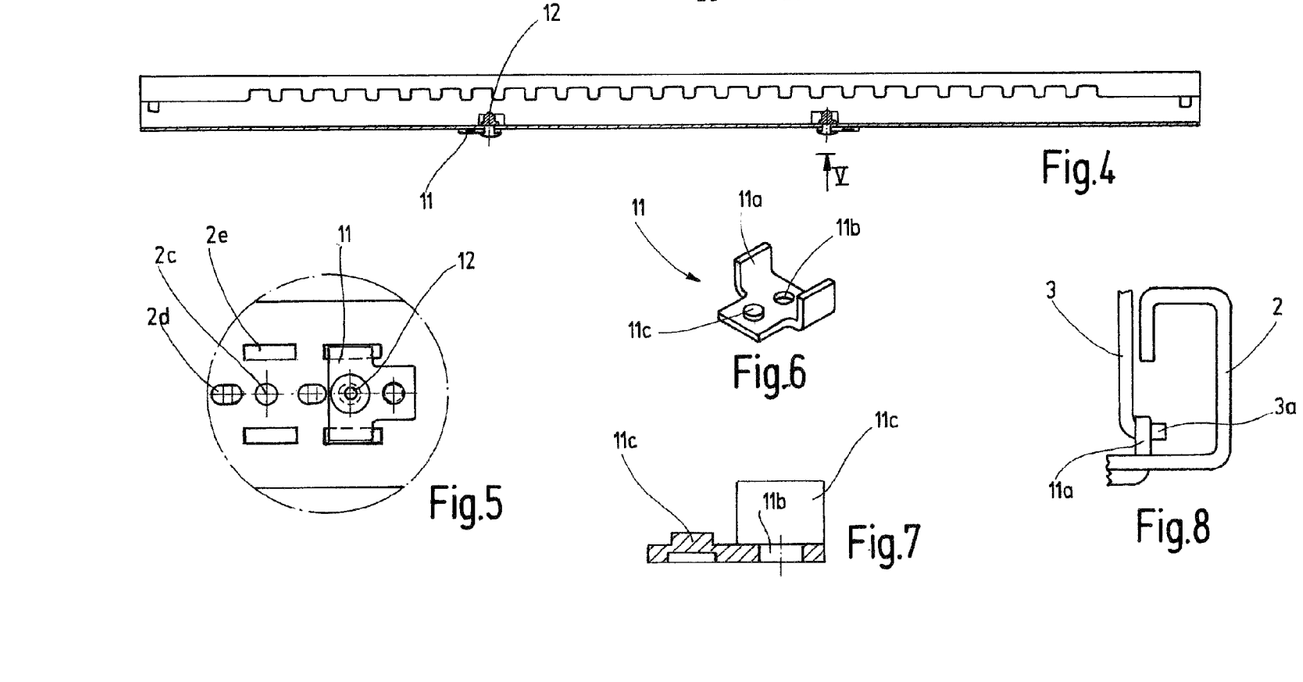
FIG. 4 is a section along the line IV-IV of FIG. 3.
FIG. 5 is a detailed view in the direction of the arrow V of FIG. 4.
FIG. 6 is a perspective view of an end stop according to the first embodiment.
FIG. 7 is a section in the longitudinal direction through the end stop of FIG. 6.
FIG. 8 is a detailed, schematic drawing of the assembly of the lower rail, end stop and upper rail according to the first embodiment.

The end stop 21 according to the second embodiment is configured corresponding to the end stop 11 of the first embodiment, so that relative thereto reference is made to the views of FIGS. 6 and 7. The end stop 21 is fixed to the lower rail 2, corresponding to the end stop 11 of the first embodiment by means of a blind rivet 22, which corresponds to the blind rivet 12 of the first embodiment, which is guided through the openings 2c and 21b aligned with one another. The projection 21c is arranged within one of the openings 2d'.

As a result of the continuous arrangement of the openings 2c and 2d' as well as the slots 2e over the length of the lower rail 2 as well as the corresponding embodiment of the end stops 21, the end stops 21 may be inserted at a plurality of positions located, in particular, equidistant relative to one another, in the longitudinal direction of the lower rail 2 and inserted into the lower rail 2 oriented in both directions and fixed thereto.

Third Embodiment

Figures 11, 12:
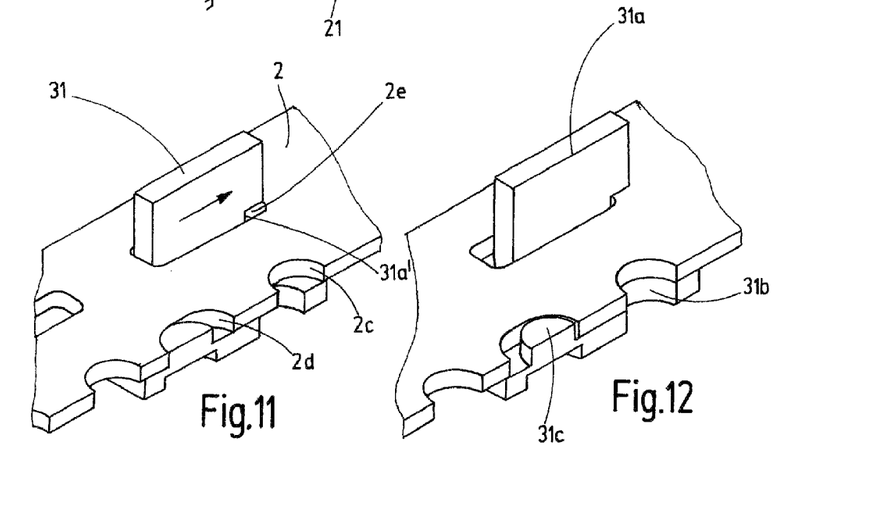
FIG. 11 is a perspective detailed view of a lower rail with an end stop according to the third embodiment after insertion and before assembly.
FIG. 12 is a view corresponding to FIG. 11 after assembly and before riveting.

The third embodiment corresponds to the first embodiment, provided it is not described otherwise below. Thus the lower rail 2 again has along the central longitudinal line a plurality of openings 2c with circular cross sections and oblong holes 2d as well as slots 2e on both sides of the openings 2c, an opening 2c, an oblong hole 2d and two slots 2e arranged on both sides of the opening 2c respectively securing a possible position of the end stop 31. The end stop 31 is also configured according to the end stop 11 of the first embodiment, but on the side of the tabs 31a more remote from the projection 31c, in the transition region to the central part of the end stop 31 notches 31a' are formed, the width thereof substantially corresponding to the material thickness of the lower rail 2, and which serve for the additional locking of the end stop 31 to the rail 2 of the receiver of an edge region of the slots 2e.

The assembly of the end stop 31 to the lower rail 2 is carried out by the tabs 31a being inserted level with the desired position of the end stop 31 on the lower rail 2 into the corresponding slots 2e, until the projection 31c is positioned in the corresponding oblong hole 2d, and the surfaces facing one another of the end stop 31 and lower rail 2 bear against one another. Subsequently, the end stop 31 is displaced in the longitudinal direction of the lower rail 2, such that the projection 31c, which is at one end of the corresponding oblong hole 2d, and the notches 31a' receive the corresponding edge regions of the slots 2e. In this position, the openings 2c and 31b are aligned with one another. A blind rivet (not shown) is positioned and riveted through the openings 2c and 31b aligned with one another, so that the end stop 31 is fastened to the lower rail 2.

Fourth Embodiment

The design of the lower rail 2 according to the fourth embodiment corresponds to that of the second embodiment, i.e. openings 2c and 2d' are continuous along the central longitudinal line, and arranged at uniform intervals, one of the openings being arranged centrally between two slots 2e, so that the end stops 41 may be attached again oriented in both directions. The end stop 41 corresponds, relative to the design of the central region, to the previously described end stops 11, 21 and 31, but differs in the design of the tabs 41 thereof. Thus the tabs comprise notches 41a' which correspond in their function to the notches 31a' of the third embodiment. Additionally, however, insertion aids 41a" in the form of claw-like projections are formed on the tabs 41a above the notches 41a' and extending in the plane of the tabs 41a, which extend on the side of the end stop 41 opposing the projection 41c.

Figure 13:
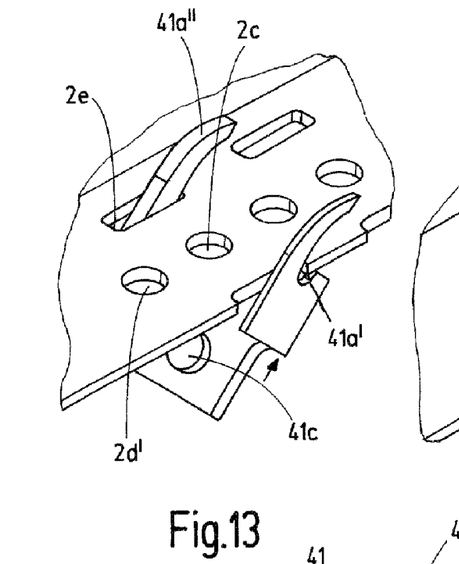
FIG. 13 is a perspective detailed view of a lower rail with an end stop according to the fourth embodiment in a first step of the assembly.
Figure 14:
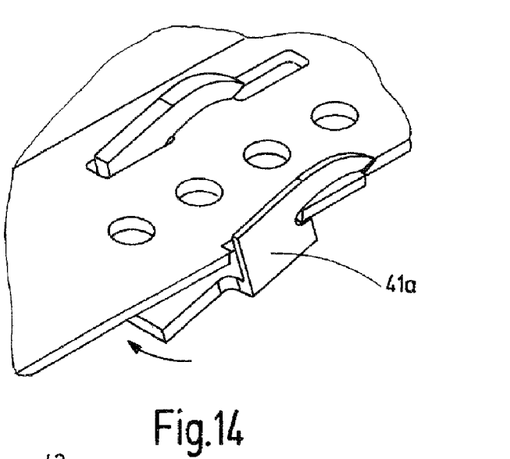
FIG. 14 is the lower rail with the end stop of FIG. 13 in a second step of the assembly.
Figure 15:
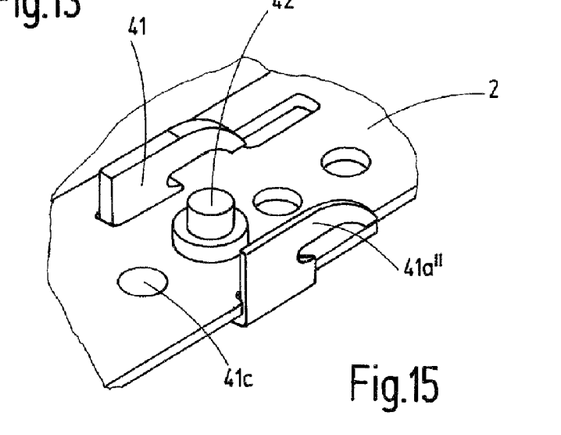
FIG. 15 is the lower rail with the end stop of FIG. 13 after the assembly and riveting has been completed.

The assembly of the end stop 41 to the lower rail 2 takes place by the insertion aids 41a" of the tabs 41a being inserted level with the desired position of the end stop 41 on the lower rail 2 in the corresponding slots 2e, the end stop 41 being positioned obliquely to the lower rail 2 for the insertion (indicated by the arrow in FIG. 13). With the bearing of the notches 41a' on the corresponding edge regions of the slots 2e, an alteration to the direction of movement takes place, namely the end stop 41 is now pivoted toward the lower rail 2 about an axis extending within the notches 41a' (see curved arrow in FIG. 14), until the end stop 41 is positioned approximately parallel with the lower rail 2. Subsequently, the end stop 41 is again slightly moved back, so that on both sides the edge region of the slots 2e consisting of the notches 41a' and on the opposing regions of the tabs 41a comes to bear against the opposing edge region of the slots 2e. Subsequently, the end stop 41 is moved in the direction of the lower rail 2, until the projection 41c of the end stop 41 is positioned in the corresponding opening 2d' and the surfaces facing one another of the end stop 41 and the lower rail 2 bear against one another. In this position, the opening 2c and the corresponding opening in the end stop 41 are aligned with one another. A blind rivet 42 is positioned and riveted through the openings aligned with one another, so that the end stop 41 is fastened to the lower rail 2.

In all the embodiments described above, the support of the projection and oblong hole and/or opening as well as the support of a part of the side surfaces of the tabs on corresponding edge regions of the slots form an additional support to the support formed by the blind rivet. Moreover, by the use of a rivet in a region of openings of corresponding dimensions aligned with one another, which are arranged without any spacings between one another, the loading of the rivet is kept as low as possible.

Figure 1:
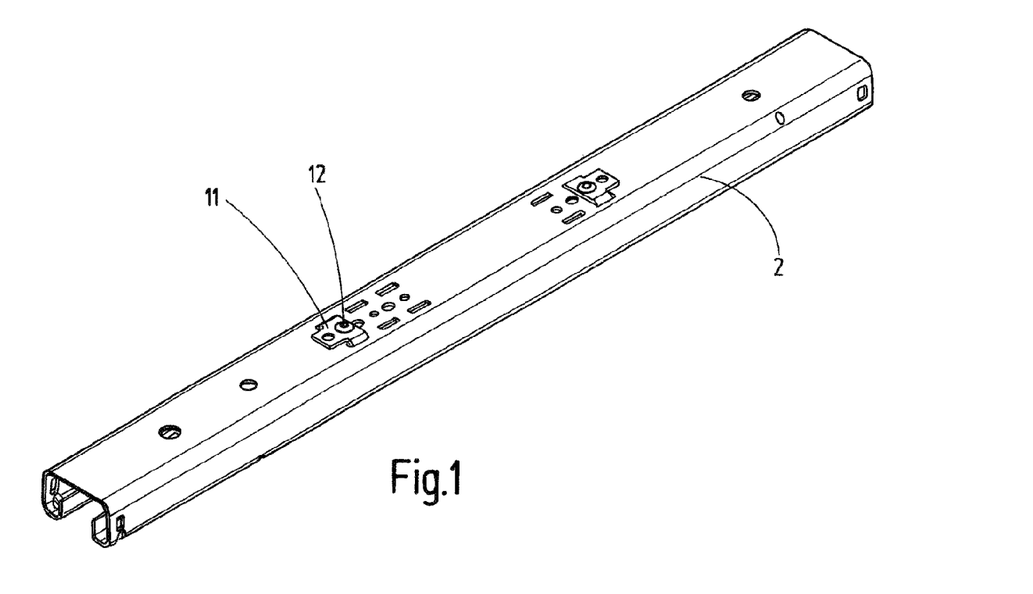
FIG. 1 is a perspective view from below of a lower rail with two fitted stops according to the first embodiment.
Figure 2:
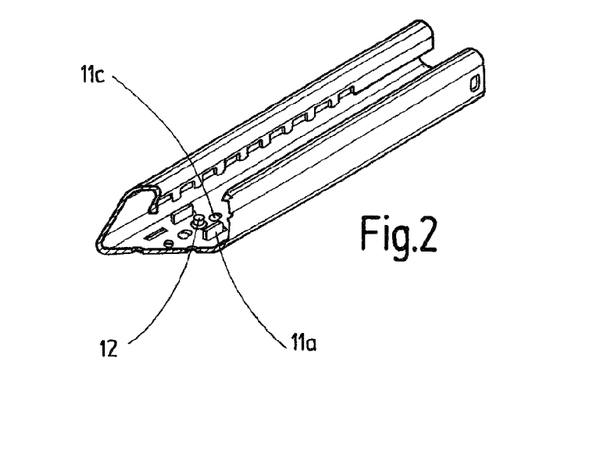
FIG. 2 is a further detailed perspective view of the lower rail with an end stop of FIG. 1.
Figure 3:
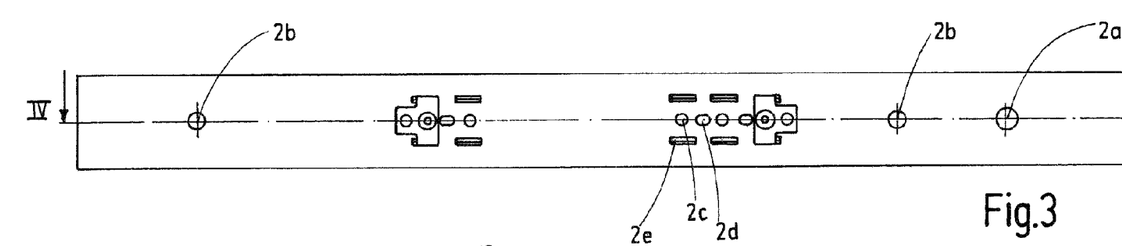
FIG. 3 is a view from below of the lower rail together with stops of FIG. 1.

Moreover, in the present case the end stops are arranged according to all embodiments such that the crossbars of the T-shaped end stops, the blind rivets also being arranged in the region thereof, are located on the side facing one another (see, for example FIG. 1).\

The regions, which are in contact with the end stop 3a of the upper rail 3, are located in all embodiments on the underside of the crossbar of the T-shaped end stops, so that the upper face of the crossbars or the corresponding notches are pressed therein against the edge regions of the slots 2e in the lower rail 2. In the case of the end stops of the upper and lower rail striking one another, the lower part of the longitudinal member is pressed against the surface of the lower rail 2 and thus the projection of the end stop in the corresponding aperture (circular opening 2d' and/or oblong hole 2d) so that additionally the loading of the blind rivet is kept low.

Fifth Embodiment

According to the fifth embodiment of a longitudinal adjuster, only the design of the end stop 51 differs substantially from that of the end stop 11 of the first embodiment. The design of the rails 2 and 3 corresponds to that of the first embodiment, but the slots 2e being configured slightly wider for the reception of the tabs 51a of the end stop 51, as may be understood from the subsequent description of the end stop 51.

Figure 17:
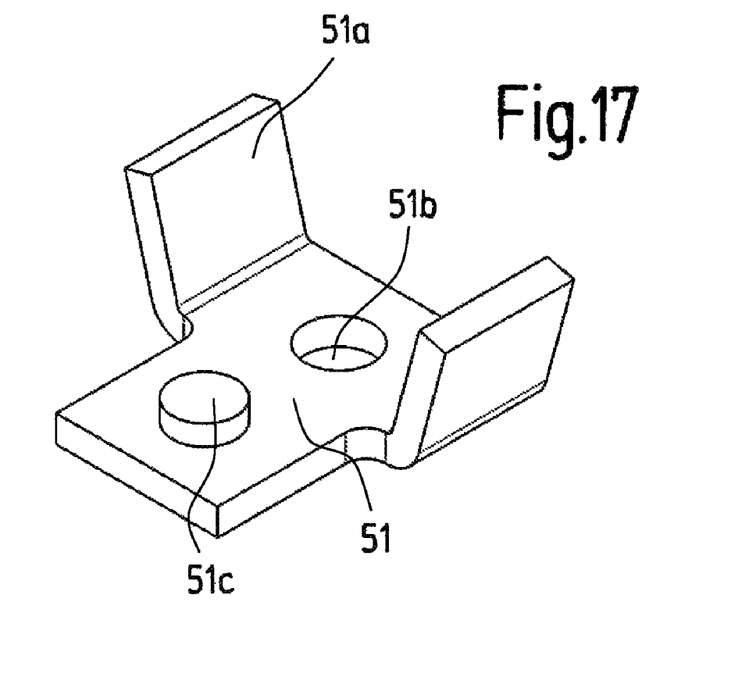
FIG. 17 is a perspective view of an end stop according to the fifth embodiment.
Figure 18:
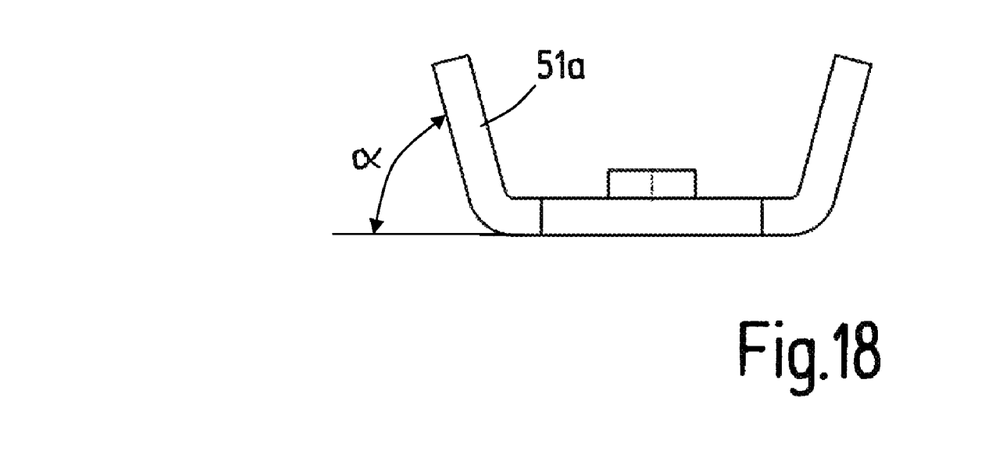
FIG. 18 is a front view of the end stop of FIG. 17.

The end stop 51 is again formed by a T-shaped stamped and bent part made of sheet metal. In this connection, as is visible from FIGS. 17 and 18, the two ends opposing one another, also denoted as tabs 11a, of the crossbar are bent at an angle α of 75° upwards. In the longitudinal member, approximately between the tabs 51a an opening 51b with a circular cross section is formed and in the other part of the longitudinal member a cam-like projection 51c with a circular cross section is formed, which projects in the same direction as the tabs 51a, the opening 51b and projection 51c being located in the central longitudinal line of the longitudinal member. The dimensions of the opening 51b and of the projection 51c correspond to those of the first embodiment. Similarly—according to the first embodiment—the widths of the crossbars and longitudinal members are approximately the same in the present case. By the smaller bending angle, by which the tabs 51a are bent up, the end stop 51 has an improved strength. Moreover, by the oblique path of the tabs 51a with an otherwise unaltered design, in particular with the same material thicknesses, as in an end stop 11 according to the first embodiment a slightly greater contact surface may be produced between the tabs 51 and the rail 3 than the contact surface between the tabs 51 and the rail 3 (see FIG. 8) so that the loading of the end stop 51 and the rail 3 when in contact with one another may be slightly reduced relative to an end stop 11 according to the first embodiment.

The attachment and fixing of the end stop 51 to the rail takes place according to that of the end stop 11 according to the first embodiment, so that further details will not be provided about this.

Although not disclosed, in the presently described embodiments fixed end stops may be provided in addition to the end stops 11, 21, 31, 41, 51 attached to the seat rail. Said fixed end stops may, for example, be formed by corresponding, bent-back regions of the seat rail or by unreleasable parts fastened to the seat rail, which is why these fixed end stops may also be considered as fixed stops. The fixed stops define the relative movement of the seat rails to one another in a maximum displacement range. The end stops 11, 21, 31, 41, 51 additionally attached to the seat rail reduce this maximum displacement range to the displacement range which is ultimately desired.

While specific embodiments of the invention have been described in detail to illustrate the application of the principles of the invention, it will be understood that the invention may be embodied otherwise without departing from such principles.

The invention claimed is:

1. A longitudinal adjuster for a vehicle seat, the longitudinal adjuster comprising:
at least one first seat rail;
at least one second seat rail which is arranged in a manner such that it may be displaced in a sliding manner relative to the first seat rail;
a first end stop attached to the first seat rail;
a second end stop, said at least one end stop limiting the relative displaceability of the two seat rails to each other by means of interaction with the second end stop formed by the second seat rail or attached thereto; and
a plurality of apertures in the first seat rail, into which protruding regions of the first end stop engage, at least one of the protruding regions of the first end stop which engage in an aperture, protruding through the aperture, and by means of the protruding region, by interaction with the second end stop, limiting the seat rail movement in the longitudinal direction of the seat rails, wherein at least two of the apertures are provided, through each of which protrudes a protruding region of the first end stop serving to limit the seat rail movement in the longitudinal direction of the seat rails and the protruding regions of the first end stop, which protrude through the at least two of the apertures, are arranged at the same height in the longitudinal direction of the seat rail.

2. The longitudinal adjuster as claimed in claim 1, wherein the protruding region is formed by one respective tab formed integrally with the first end stop and the associated aperture being formed in each case by a slot in the first seat rail.

3. The longitudinal adjuster as claimed in claim 2, wherein the first end stop is of T-shaped configuration, the ends of a crossbar being bent in one direction mirror symmetrically to the longitudinal axis of the first end stop by an angle of 45° to a maximum of 135° relative to the longitudinal member of substantially planar configuration, with tabs formed, which protrude through apertures in the first seat rail, and one respective lateral region of the tabs protruding through the apertures, cooperating with the second end stop.

4. The longitudinal adjuster as claimed in claim 3, wherein the ends of the crossbar are bent in one direction by 75° relative to the longitudinal member of substantially planar configuration.

5. The longitudinal adjuster as claimed in claim 3, wherein the ends of the crossbar are bent in one direction by 90° relative to the longitudinal member of substantially planar configuration, so that the ends of the crossbar are arranged parallel to one another.

6. The longitudinal adjuster as claimed in claim 3, wherein along the central longitudinal line of the longitudinal member a projection and an opening are configured.

7. The longitudinal adjuster as claimed in claim 6, wherein the opening is arranged centrally between the tabs.

8. The longitudinal adjuster as claimed in claim 1, wherein the first end stop has at least one projection, which is positioned in an aperture configured in the first seat rail, as an oblong hole or an opening, and with one region bears against the edge region of the aperture.

9. The longitudinal adjuster as claimed in claim 1, wherein the first end stop has at least one notch which cooperates with an edge region of an aperture in the first seat rail, in particular keeps the first end stop in abutment against the seat rail.

10. The longitudinal adjuster as claimed in claim 1, wherein the first end stop has insertion aids.

11. The longitudinal adjuster as claimed in claim 10, wherein the insertion aids are formed by regions of tabs which are of curved configuration protruding in the insertion direction.

12. The longitudinal adjuster as claimed in claim 1, wherein the first end stop is fastened by means of a blind rivet to the seat rail.

13. The longitudinal adjuster as claimed in claim 1, wherein on the first end stop at least one resiliently deformable damping element is provided in the region of the surface coming into contact with the second end stop.

14. The longitudinal adjuster as claimed in claim 1, wherein the first end stop is formed by a stamped and bent part.

15. The longitudinal adjuster as claimed in claim 1, wherein the first end stop reduces the maximum regulating distance of the seat rails which is limited by a fixed stop.

16. A vehicle seat comprising a longitudinal adjuster, the longitudinal adjuster comprising:
a first seat rail;
a second seat rail arranged to be displaced in a sliding manner relative to the first seat rail;
a first end stop attached to the first seat rail;
a second end stop formed by the second seat rail or attached thereto, the first end stop limiting the displaceability of the two seat rails relative to each other by means of interaction with the second end; and a plurality of apertures in the first seat rail, into which protruding regions of the first end stop engage, at least one of the protruding regions of the first end stop interacting with the second end stop for limiting the seat rail movement in the longitudinal direction of the seat rails, wherein at least two of the apertures are provided, through each of which protrudes a protruding region of the first end stop and the protruding regions of the first end stop, which protrude through the at least two of the apertures, are arranged at the same height in the longitudinal direction of the seat rail.

17. A vehicle seat as claimed in claim 16, wherein:
the protruding region is formed by tabs formed integrally with the first end stop; and
the associated aperture is formed in each case by a slot in the first seat rail.

18. A vehicle seat as claimed in claim 17, wherein the first end stop is of a T-shaped configuration with ends of a crossbar bent in one direction mirror symmetrically to the longitudinal axis of the first end stop by an angle of 45° to a maximum of 135° relative to the longitudinal member of substantially planar configuration to form tabs which protrude through the apertures in the first seat rail, a region of each of the tabs protruding through the apertures cooperating with the second end stop.

19. A vehicle seat as claimed in claim 18, wherein:
along the central longitudinal line of the longitudinal member a projection and an opening are configured; and
the opening is arranged centrally between the tabs.

20. A vehicle seat as claimed in claim 16, wherein the first end stop has at least one projection, which is positioned in an aperture configured in the first seat rail as an oblong hole or an opening, and with one region bears against the edge region of the aperture.

* * * * *